United States Patent [19]

Wechsler et al.

[11] Patent Number: 5,279,123
[45] Date of Patent: Jan. 18, 1994

[54] APPARATUS FOR RECOVERY AND USE OF WASTE THERMAL ENERGY

[75] Inventors: Monroe S. Wechsler, Ames; John H. Van Gerpen, Cedar Falls, both of Iowa

[73] Assignee: Iowa State University Research Foundation, Inc., Ames, Iowa

[21] Appl. No.: 996,518

[22] Filed: Dec. 23, 1992

Related U.S. Application Data

[63] Continuation of Ser. No. 893,577, Jun. 4, 1992, abandoned.

[51] Int. Cl.$^5$ .................................... F03G 7/00
[52] U.S. Cl. ............................. 60/527; 60/531
[58] Field of Search .............. 60/527, 528, 529, 530, 60/531

[56] References Cited

U.S. PATENT DOCUMENTS

| | | | |
|---|---|---|---|
| 3,913,326 | 10/1975 | Banks | 60/527 |
| 3,937,019 | 2/1976 | Renner | 60/527 |
| 4,041,706 | 8/1977 | White | 60/527 |
| 4,086,769 | 5/1978 | Smith | 60/527 |
| 4,393,654 | 7/1983 | Pelly | 60/527 |

Primary Examiner—Ira S. Lazarus
Assistant Examiner—L. Heyman
Attorney, Agent, or Firm—Flynn, Thiel, Boutell & Tanis

[57] ABSTRACT

Energy recovery apparatus for recovering and using thermal energy comprises multiple series of shape memory elements having decreasing transformation temperatures from one element to the next in the direction of a heating fluid to extract heat over a range of fluid temperatures to effect a shape change of each element. Cooling fluid is flowed alternately through each series of elements to cool the elements and effect another shape change. The cooling fluid exiting a preceding series of elements is used as the heating fluid of the next series of elements to extract further heat indirectly from the original heating fluid. The shape changes of the elements are converted to mechanical work.

14 Claims, 3 Drawing Sheets

APPARATUS FOR RECOVERY AND USE OF WASTE THERMAL ENERGY

This application is a continuation of U.S. Ser. No. 07/893,577, filed Jun. 4, 1992, now abandoned.

FIELD OF THE INVENTION

The present invention relates to an energy recovery apparatus and method especially for recovering and using waste thermal energy to do work.

BACKGROUND OF THE INVENTION

Today, there is widespread interest in conserving non-renewable natural resources and, in particular, in improving the fuel efficiency of vehicles powered by internal combustion engines. Since approximately two-thirds of the fuel energy in internal combustion engines is dissipated as heat to the exhaust and coolant systems, there is interest in recovering at least a fraction of this wasted thermal energy to do useful work and improve vehicle fuel economy. The relatively low temperature of this dissipated heat has been a deterrent to its exploitation since standard energy recovery techniques have not been sufficiently efficient in this regard.

It is an object of the present invention to provide an energy recovery apparatus and method including multiple series of shape memory elements having different transformation temperatures for use in a manner to directly and indirectly recover thermal energy from a relatively low temperature fluid flow, such as, for example, waste exhaust gases of an internal combustion engine.

It is another object of the present invention to provide an energy recovery apparatus and method including multiple series of shape memory elements having different transformation temperatures for use in a manner to directly and indirectly recover thermal energy from a relatively low temperature fluid flow over a substantial range of fluid temperatures down to a near-ambient temperature level where the fluid is exhausted to ambient, thereby improving the efficiency of energy recovery from the fluid flow.

SUMMARY OF THE INVENTION

The present invention involves an energy recovery apparatus and method for recovering and using thermal energy from a heating fluid, such as exhaust gases from an internal combustion engine. The energy recovery apparatus comprises a first series of shape memory elements having a transformation temperature range that decreases from one element to the next in the direction of flow of the heating fluid therealong such that thermal energy is extracted directly from the heating fluid over a range of fluid temperatures preferably down to a near-ambient temperature level to heat the elements sufficiently to effect a first shape change thereof. The heating fluid is exhausted to ambient when its temperature reaches a near-ambient level where further heat extraction would be relatively inefficient.

Means is provided for alternately directing a first cooling fluid along the first series of heated shape memory elements in a direction opposite to the direction of flow of the heating fluid such that thermal energy is extracted from the heated elements over a range of temperatures to cool the elements sufficiently to effect a second shape change thereof. The heated first cooling fluid is directed by suitable means from the first series of shape memory elements along a second series of shape memory elements having transformation temperature ranges that also decrease from one element to the next in the direction of flow of the heated first cooling fluid such that thermal energy is extracted from the heated cooling fluid over a range of fluid temperatures preferably down to a near-ambient temperature level to heat the elements of the second series sufficiently to effect a shape change thereof. In this way, thermal energy is recovered indirectly from the original heating fluid.

The heated cooling fluid is exhausted to ambient after it flows by the second series of shape memory elements where its temperature reaches a near-ambient level where further heat extraction would be relatively inefficient.

The apparatus includes means associated with the second series of elements for alternately directing a second cooling fluid flow along the heated shape change memory elements of the second series in a direction opposite to the direction of flow of the heated first cooling fluid such that thermal energy is extracted from the elements over a range of temperatures to cool them sufficiently to effect another shape change of the elements. The heated second cooling fluid can be further directed, if desired, along a third series of shape memory elements having still further decreasing transformation temperature ranges from one element to the next in the manner described hereabove such that additional heat is extracted from the heated cooling fluid. The number of series of shape memory elements for recovering additional residual thermal energy may be selected as desired to achieve a selected energy recovery efficiency.

The apparatus further includes means operably coupled to said shape memory elements for converting the element shape changes to mechanical work whereby the recovered thermal energy is used to do mechanical work.

In one embodiment of the invention, a waste heating fluid, such as internal combustion engine exhaust gases, is directed along the first series of shape memory change elements.

In another embodiment of the invention, the first and second cooling fluids each comprise ambient air flowed along the respective first and second series of shape memory elements.

In still another embodiment of the invention, the first and second series of shape memory elements comprise tubular or other shaped members through or past which the heating and cooling fluids are alternately flowed.

A method of recovering and using thermal energy in accordance with one embodiment of the invention comprises directing a heating fluid along the aforementioned first series of shape memory elements such that thermal energy is extracted from the heating fluid over a range of fluid temperatures to heat the elements sufficiently to effect a first shape change thereof and directing a first cooling fluid along the first series of heated shape memory elements in a direction opposite to the direction of flow of the heating fluid such that thermal energy is extracted from said elements over a range of temperatures to cool the elements sufficiently to effect a second shape change thereof. The heated first cooling fluid from the first series of shape memory elements is directed along a second series of shape memory elements such that thermal energy is extracted from the heated cooling fluid over a range of fluid temperatures to heat the elements sufficiently to effect a shape change thereof. A second cooling fluid is directed to flow along said second series of heated shape change memory elements in a direction opposite to the direction of flow of the heated first cooling fluid such that thermal energy is extracted from the heated elements over a range of temperatures to cool the elements sufficiently to effect another shape change thereof. The element shape changes are converted to mechanical work during the heat recovery process.

The aforementioned objects and advantages of the present invention will become more readily apparent from the following detailed description taken with the following drawings.

DETAILED DESCRIPTION OF THE INVENTION

Figure 1:
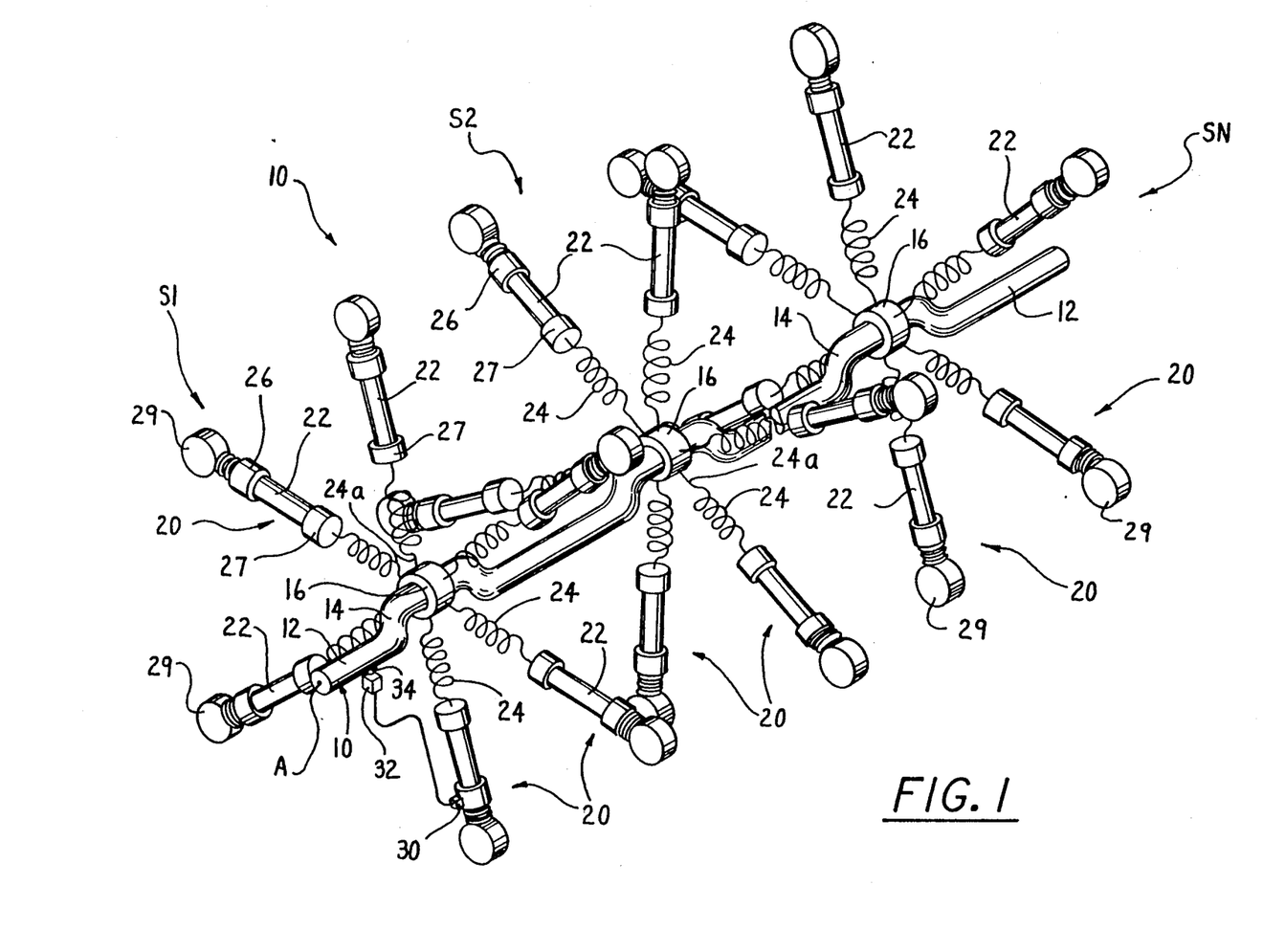
FIG. 1 is a simplified schematic view of apparatus for recovering and using thermal energy from a waste heating fluid in accordance with one embodiment of the invention.
Figure 2:
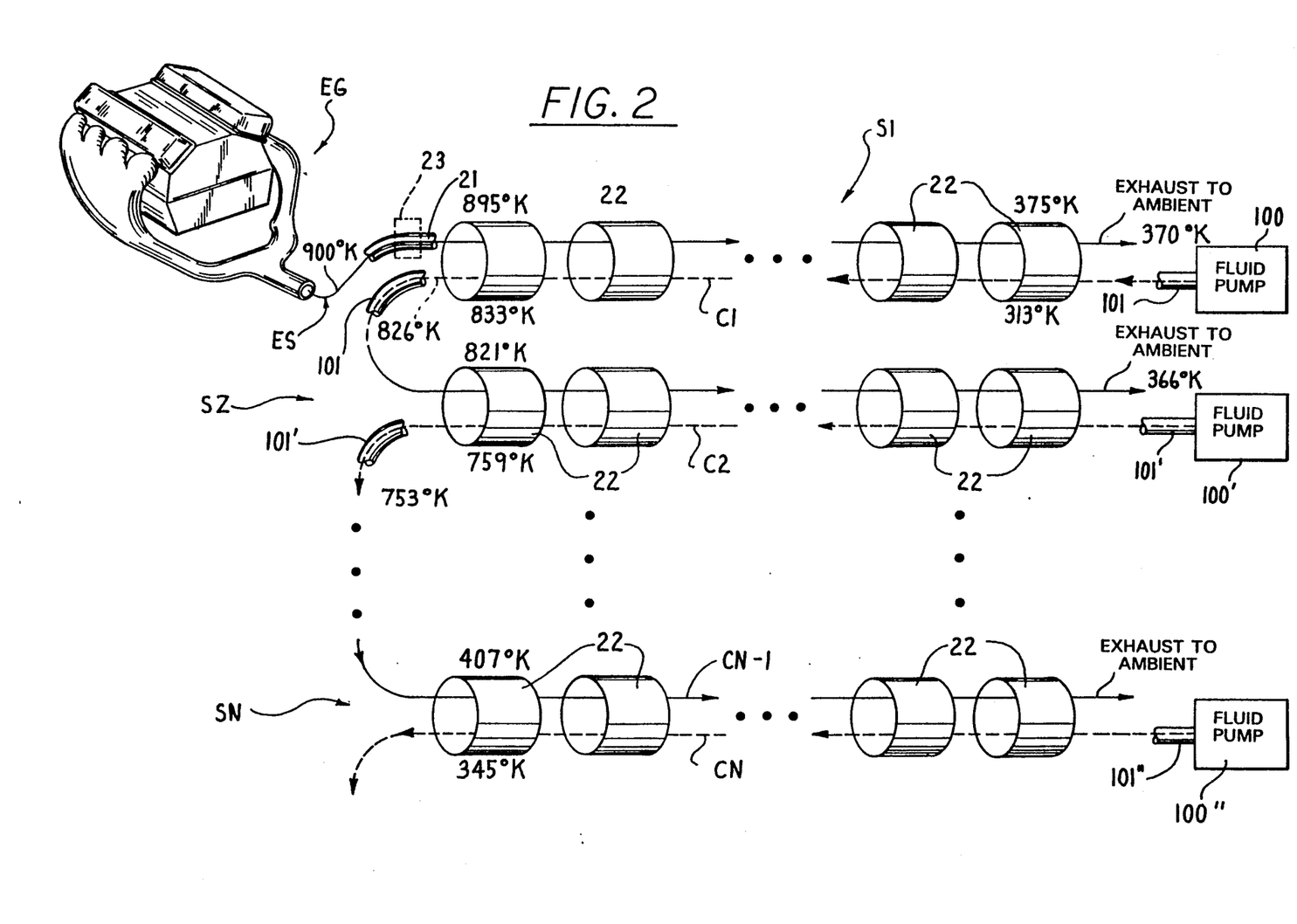
FIG. 2 is a simplified schematic view of the shape memory tubular elements of the apparatus of FIG. 1 illustrating the series arrangement of series S1,S2 ... SN and the flow of heating and cooling fluids therethrough.

Apparatus in accordance with one embodiment of the invention for recovering and using thermal energy from a relatively low temperature heating fluid is illustrated schematically in FIGS. 1–2. The invention is illustrated and described herebelow with respect to recovering thermal energy from the exhaust gas stream ES of an internal combustion engine EG for purposes of illustration only. The invention is not limited to the embodiment illustrated and can be practiced more generally to recover thermal energy from available relatively low temperature fluid streams.

Referring to FIGS. 1–2, a thermal energy recovery and conversion apparatus 10 is illustrated in simplified schematic manner as an offset-crank heat engine having a crankshaft 12 with a rotational axis A, a crank arm 14 and a crank bearing 16 that is rotated about the crankshaft axis A by a plurality of force-applying spokes 20. The spokes 20 each include a tubular shape memory element 22 in mechanical series with a spring 24 having an inner end 24a connected to the crank bearing 16 as shown in FIG. 1.

Six spokes 20 are illustrated in FIG. 1 for each series S1,S2 ... SN of shape memory elements 22, although, as will become apparent, the invention is not limited to use of any particular number of spokes. FIG. 2 illustrates for each series S1,S2 ... SN only four shape memory elements 22 instead of the six shown in FIG. 1 for the sake of convenience in illustrating fluid flows.

Each tubular shape memory element 22 is supported in tension by end grips 26,27 and the associated spring 24. At the outer end, each spoke 20 includes a pivot pin 29 mounted on a fixed housing or casing (not shown) of the apparatus 10.

The grips 26,27 each include a passage (not shown) through which the heating fluid or cooling fluid can be directed alternately through the tubular shape memory elements 22. Suitable insulated fluid conduits (not shown for convenience) can be used to interconnect the grips 26,27 of the shape memory elements 22 in the type of fluid flow relation depicted in FIG. 2 for purposes of practicing the invention as described herebelow.

An electrical solenoid valve 30 (only one shown) is mounted on each grip 26 to control flow of either a heating fluid or a cooling fluid to the associated tubular shape memory element 22. The solenoid valve 30, in turn, is controlled to open/close by a microswitch 32 (only one shown) that is actuated by a respective cam 34 (only one shown) on the crankshaft 12. It will be understood that each tubular shape memory element 22 has an associated solenoid valve 30, microswitch 32 and crankshaft cam 34 that control flow of a heating fluid or cooling fluid through the element 22 since the work output per cycle of the apparatus 10 depends on the timing of the shape changes (i.e., extension/contraction) of each element 22 by the heating/cooling fluid flow.

Figure 3A:
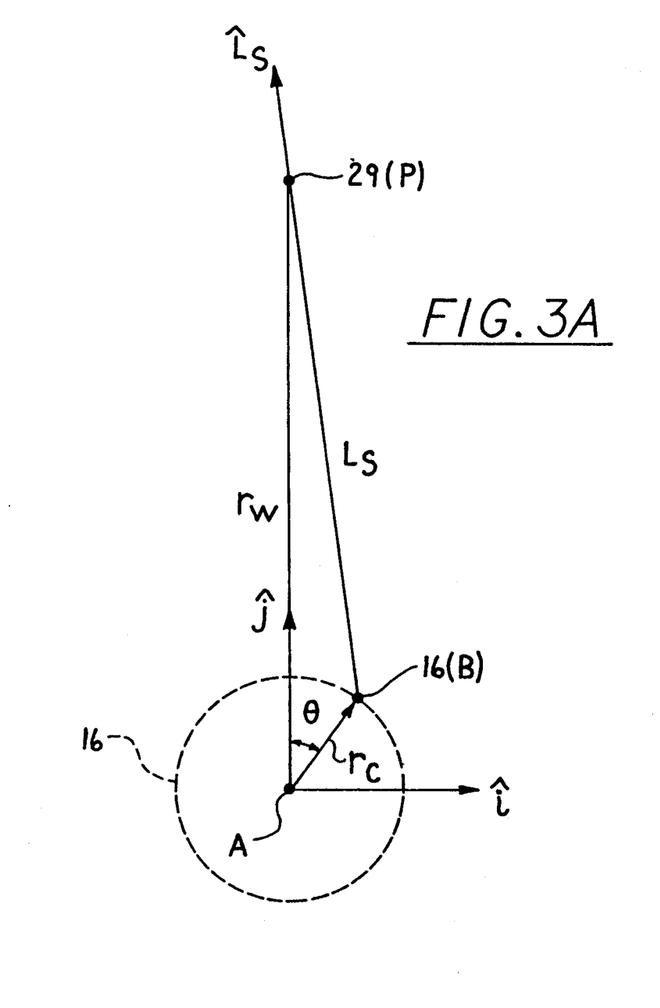
FIG. 3A is a schematic illustration of an off-set crank, spoke and wheel and geometric relationship thereof.

For example, as shown in FIG. 3A, the pin 26 to the crankshaft axis A) is designated $r_w$, the crank length $r_c$, the variable spoke length $L_s$, and the crank angle $\theta$, where $\theta$ is measured clockwise from the top dead center position corresponding to the minimum $L_s$. The horizontal and vertical directions are designated $\hat{i}$ and $\hat{j}$, respectively, an as shown in FIG. 3A where "$\wedge$" indicates a unit vector. The spoke length at angle $\theta$ can be considered to consist of the sum of the spring length, $L_k$, the element length, $L_t$, and the remaining fixed distances due to the linkages and end pieces, $L_r$, i.e., $$\vec{L}_s = [L_k(\theta) + L_t(\theta) + L_4]\hat{L}_s$$

Figure 3B:
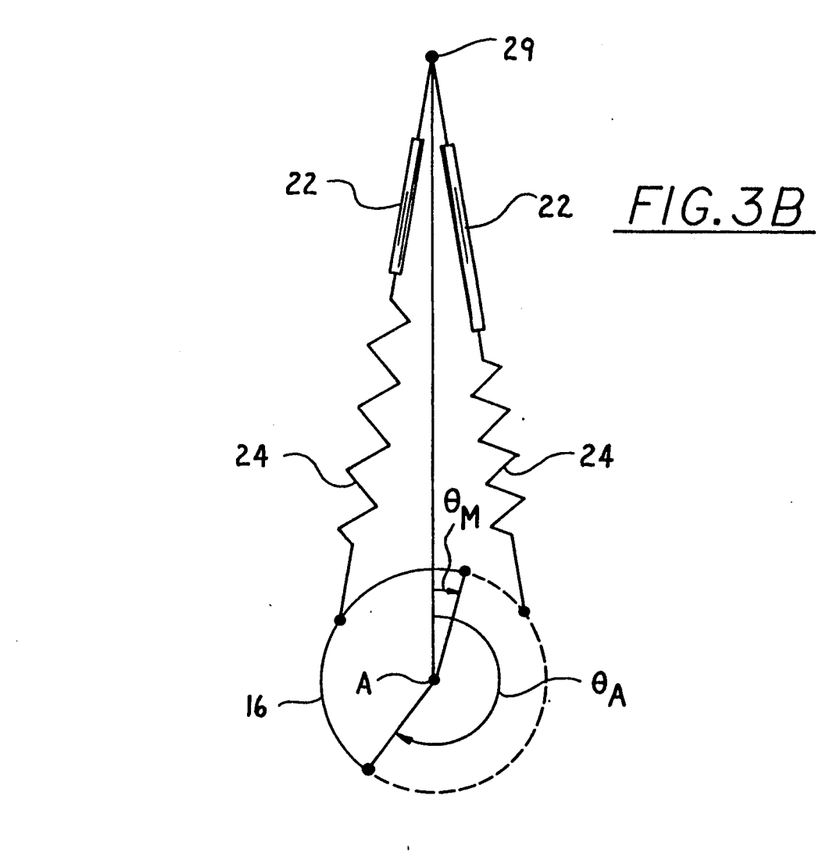
FIG. 3B is a schematic illustration of the timing of contraction and extension of a shape memory element relative to crankshaft rotation angle.

For the spring length, we let $$L_k = L_o + L_e(\theta)$$

where $L_o$ is the unloaded spring length and $L_e(\theta)$ is the extension that the spring experiences when the crankshaft is rotated to angle $\theta$. Also, we consider the transformation to martensite of the element 22 to occur with the element extension $\Delta L$ at angle $\theta_m$, as illustrated in FIG. 3B, and the reverse transformation to austenite to occur at $\theta_A$ with the contraction $\Delta L$. Thus, $$L_t(\theta) = \begin{cases} L_t, & 0 < \theta < \theta_m \\ L_t + \Delta L, & \theta_m < \theta < \theta_A \\ L_t, & \theta_A < \theta < 2\pi \end{cases}$$

The force acting at the end of the crank arm is $$\vec{F}(\theta) = KL_e(\theta)\hat{L}_s = K[L_s(\theta) - L_T(\theta) - L_r - L_o]\hat{L}_s$$

where, as shown in FIG. 3A, $$\vec{r}_c(\theta) = r_c \sin\theta \hat{i} + r_c \cos\theta \hat{j} \text{ and}$$

$$\vec{L}_s(\theta) = \vec{BP} = \vec{r}_w - \vec{r}_c = -r_c \sin\theta \hat{i} + (r_w - r_c \cos\theta)\hat{j}$$

whereby $$L_s(\theta) = (r_c^2 + r_w^2 - 2r_c r_w \cos\theta)^{\frac{1}{2}} \qquad (1)$$

The moment that the force exerts on the crankshaft is $$\vec{M}(\theta) = \vec{r}_c(\theta) \times \vec{F}(\theta)$$

and the work done per cycle is $$W = \int_0^{2\pi} M(\theta)d(\theta)$$

which gives $$W = K \Delta L [L_2(\theta_A) - L_s(\theta_m)]$$

where $L_s(\theta)$ is given by equation (1) above. It is clear that W (work) has its maximum value when $\theta_m = 0$ and $\theta_A = \pi$, yielding $$W_{max} = 2K \Delta L \; r_c.$$

The transformations to martensite and austenite referred to hereabove relate to the phase changes that the shape memory elements 22 undergo when they are alternately cooled and heated relative to the respective martensitic and austenitic transformation temperatures.

Shape memory alloys are well known in the art to undergo a martensitic (diffusionless) transition dependent upon the temperature applied to the alloy. Upon cycling between high and low temperature phases, the alloy recovers the shape it had in one or both of the phases (one-way or two-way memory, respectively). Thus, upon repeated temperature cycling, a cyclic change in shape occurs. This change in shape can be used to convert heat to usable mechanical work. The high and low temperature shapes can be predetermined (particularly the high temperature shape), and the transformation temperature of the shape memory element can be varied by changing the alloy composition.

In martensitic phase transformations, the change in crystal structure occurs in a diffusionless manner. The term "martensite" is derived from the well-known austenite-martensite face-centered cubic to body-centered cubic tetragonal transformation in steel, although steels do not exhibit shape memory behavior. The best known shape memory alloy is Ni-Ti in near equiatomic composition. However, other alloys such as Au-Cd, Cu-Zn, Cu-Al, Cu-Al-Ni, Cu-Zn-Al, Fe-Ti, and In-Ti exhibit shape memory behavior. The article by Jackson et al. "55-Nitinol—The Alloy with a Memory: Its Physical Metallurgy, Properties and Applications", National Aeronautics and Space Administration, Washington, DC 1972, provides a broad survey of the properties of Ni-Ti alloys. Also see U.S. Pat. Nos. 3,174,851; 3,403,238 and 3,558,369.

Shape memory alloys exhibiting transformation temperatures at higher temperature ranges are described by Linquist and Wayman "Shape Memory and Transformation Behavior of Martensitic Ti-Pd-Ni and Ti-Pt-Ni Alloys", *Engineering Aspects of Shape Memory Alloys*, Butterworth-Heinemann, London, 1990. For example, Ti-Pd-Ni and Ti-Pt-Ni alloys are described as exhibiting shape memory with transformation temperatures that range up to $A_f = 590°$ C. (863° K.) for Ti-Pd-Ni and $A_f = 702°$ C. (975° K.) for Ti-Pt-Ni where $A_f$ is the austenite finish temperature.

Referring to FIGS. 1 and 3B, the shape memory elements 22 each are shown as an elongated tubular member that is extended in length (see right hand side of FIG. 3B) when the temperature of the particular element is below the transformation temperature (i.e., below the martensite start and finish temperatures $M_s$ and $M_f$, respectively). On the other hand, when the temperature of a particular element 22 is above the austenite start and finish temperatures $A_s$ and $A_f$, respectively, each element 22 is contracted in length (see left hand side of FIG. 3B). A work producing stroke is thus provided by the shape changes between the contracted and extended shapes of the elements 22.

The elements 22 can be "trained" by repeated temperature and stress cycling through the transformation temperature in the heat engine to increase shape memory and reduce hystersis.

In accordance with the present invention, the apparatus 10 includes series of shape memory elements 22 that have alloy compositions that differ from one element 22 to the next in the direction of flow of the heating fluid (i.e., the exhaust stream ES from the internal combustion engine EG) such that the transformation temperature ranges (i.e., $A_f$ to $M_f$) of the elements 22 vary stepwise from one element 22 to the next in said direction by a preselected amount; for example, by decreasing increments of 10° C. from one element 22 to the next in the direction of flow of the exhaust stream ES. The particular shape memory alloys used to practice the invention will depend on the heating fluid temperatures to be encountered in use of the apparatus 10 and can be selected accordingly from shape memory alloys such as those identified hereabove.

As shown best in FIG. 2, a selected number of the shape memory elements 22 are arranged in a first series S1 along the length of the flow path of the exhaust gas stream EG to directly contact the stream ES. The stream ES is directed from the internal combustion engine EG by suitable conduit means 21 (shown schematically) and an optional fluid pump 23 (shown schematically).

A selected number of other of the shape memory elements 22 are arranged in a second series S2 along the length of the flow path of a heated cooling fluid C1. This is followed by successive series of elements S3,S4, . . . , in a similar way, such that in each case the heated cooling stream for a given series, heated to its maximum level, becomes the heating stream for the following series. Since the highest temperature reached by the cooling stream decreases from one series to the next, this temperature is ultimately so low that no additional series of shape memory elements can be operated. The last series in the system is labelled SN in FIG. 2.

In particular, the efficiency of the shape memory elements 22 can be estimated by using the equation, n (efficiency) $= W/Q_{in}$ where $$W = (\epsilon_A - \epsilon_M)(\sigma_H - \sigma_L)$$

$$Q_{in} = Q_1 + Q_2$$

$$Q_1 = \rho C[(\Delta T)_T + (\Delta T)\sigma]$$

$$Q_2 = (d\sigma/dT)(\epsilon_A - \epsilon_M)A_f$$

$$(\Delta T)_T = \text{thermal hysteresis}$$

$$(\Delta T)_{94} = \text{stress hysteresis} = (\sigma_H - \sigma_L)/(d\sigma/dT)$$

In the above equations, $A_f$ is the transformation finish temperature on heating at the high stress, $\sigma_H$. In the present invention, the $A_f$ temperatures for the shape memory elements 22 are preselected as described hereabove to differ in increments from one element to the next in each series S1,S2 . . . SN. Also in the above equations, $\epsilon_A - \epsilon_M$ is the transformational strain, $\sigma_H$ is the high stress at which the M→A transformation occurs, $\sigma_L$ is the low stress at which the A→M transformation occurs, $\rho$ is the density of the elements, C is the specific heat, and $(\Delta T)_T$ is the thermal hysteresis. The stress rate, $d\rho/dT$, is a measure of the increase in stress required to increase the transformation temperature as dictated by the Clausius-Clapyron equation:

$$d\sigma/dT = H/[T(\epsilon_A - \epsilon_M)]$$

where H is the latent heat per unit volume.

As mentioned, the number of shape memory elements 22 will decrease from one series S1,S2 ... SN to the next. For purposes of illustration only, the number of shape memory elements in series could be as follows:

TABLE

| Series | Number of Elements |
| --- | --- |
| 1 | 53 |
| 2 | 46 |
| 3 | 39 |
| 4 | 31 |
| 5 | 25 |
| 6 | 18 |
| 7 | 11 |
| 8 | 5 |
| Total | 228 |

The number of elements 22 in each series set forth in the Table is based on the choice of fluid temperature parameters set forth on FIG. 2 and on the following additional parameters:

transformation strain $\epsilon_A - \epsilon_M = 0.04$
specific heat C = 460 Joules/kg° C.
density $\rho = 6.54$ grams/cm$^3$
stress rate $d\sigma/dT = 6.55$ MPa/°C.; 16.34 MPa/K
thermal hysteresis $(\Delta T)_T = 30°$ C.
stress hysteresis $\sigma_H - \sigma_L = 207$ MPa Moreover, the number of shape memory elements 22 set forth in the Table is based on equiatomic binary Ti-Ni alloys that do not differ in composition from one element to the next.

Thus, numbers of shape elements set forth in the Table are merely calculated (rather than actual) values offered only to illustrate how the number of elements 22 can decrease from one series S1,S2 ... SN to the next as thermal energy is recovered directly and indirectly from the exhaust stream ES in accordance with the invention.

With respect to the Table, a variety of different shape memory alloy types and compositions can be used to provide appropriate transformation temperature ranges in each series 1-8.

Referring to FIG. 2, operation of the apparatus 10 to recover thermal energy from a heating fluid represented in FIG. 2 by the exhaust stream ES will be described now. In particular, the exhaust stream is considered for purposes of illustration only to enter the first series S1 of elements 22 at 900° C. The stream ES is first directed by the conduit means 21 and the optional fluid pump 23 to flow through the first series SI of elements 22 having transformation temperatures that decrease incrementally from one element to the next in the direction of flow of flow of the stream ES through the first series. The stream ES directly contacts each element 22 in the series S1 such that heat is extracted by the elements 22 from the stream over a range of stream (fluid) temperatures. Each element 22 in the first series is heated by the stream ES from its respective $M_f$ to its respective $A_f$ temperature to produce the contracted shape (see left hand side of FIG. 3B) and thus one-half of the aforementioned work stroke (i.e., a half-cycle of operation of the apparatus 10). In FIG. 2, the temperatures shown above and below certain elements 22 refer to their transformation temperatures on heating and cooling, respectively. The temperatures shown at the heating stream ES (solid line) and the cooling streams C1, C2 ... CN (dashed lines) refer to the respective stream temperatures. In FIG. 2, a temperature drop of the stream ES of 10° C from element 22 to element 22 is used for purposes of illustration.

Ultimately, at the extreme right hand end of the first series S1 of elements 22, the rejected heating fluid (i.e., stream ES) is so low in temperature (i.e., so close or near to the ambient temperature such as within 70° of ambient) that no additional elements 22 can be operated in that series. Thus, the stream ES is exhausted to ambient after flowing through the last element 22 in the first series S1 as shown in FIG. 2.

During the cooling half-cycle of operation of the apparatus 10, a first cooling stream C1 (cooling fluid) is alternately flowed from a suitable source (e.g., ambient air at 300° K. for example) through the elements 22 of the first series S1 in a direction opposite or counter to the previous flow of the exhaust stream ES. The cooling stream C1 is flowed through the first series typically by a fluid pump 100 and conduit means 101, both shown schematically. The cooling stream C1 starts at an initial temperature of 300° K. for example at the extreme right hand end of the first series S1 and is heated as it flows through the previously heated elements 22 in the first series S1.

The cooling steam C1 extracts heat from each element 22 in the first series S1 over a range of stream (fluid) temperatures. Each element 22 in the first series S1 is cooled by the stream C1 from its respective $A_f$ to its respective $M_f$ temperature to produce the extended shape (see right hand side of FIG. 3B) and thus the other half of the aforementioned work stroke of the elements 22.

The temperature of the cooling stream C1 increases as it flows from right to left through the first series S1 of elements 22. The temperature of the cooling stream C1 will be highest as it exits from the extreme left hand element 22 of the first series S1. However, the highest temperature reached by the cooling stream C1 in the first series S1 will be below the original temperature of the exhaust stream ES (900° C.) by an amount corresponding to the sum of: (1) thermal hysteresis, $\Delta T_T$, (2) the change in transformation temperature, $\Delta T_\sigma$, due to the stress differential, $\sigma_H - \sigma_L$, and (3) the temperature change resulting from an energy extraction equal to the work done by the first series S1 of elements 22. The highest temperature of the heated cooling stream C1 at the left-hand end of the first series is shown as 826° K. for purposes of illustration. This temperature is 74° K. below the original temperature of the exhaust stream ES.

As shown in FIG. 2, when the heated cooling stream C1 emerges from the last element 22 at the left-hand end of the first series S1, the heated stream C1 is directed by the conduit means 101 to flow through the second series S2 of elements 22 whose transformation temperatures decrease in increments in the direction of flow of the heated cooling stream C1 through the second series S2. The heated cooling stream C1 thus becomes the heating fluid for the second series S2 of elements 22 such that each element 22 in the second series S2 is heated by the stream C1 from its respective $M_f$ to its respective $A_f$ temperature to produce the contracted shape (see left hand side of FIG. 3B) and thus one-half of the aforementioned work stroke (i.e., a half-cycle of operation of the apparatus 10). The heated cooling stream C1 is ultimately exhausted from the extreme right-hand element 22 of the second series S2 when its temperature is near-ambient (i.e., so close to ambient temperature as to be ineffective to operate additional elements 22). In FIG. 2, the stream C1 is shown being exhausted to ambient when its temperature reaches 366° K. after flowing through the last (right-hand) element 22.

Still referring to FIG. 2, a second cooling stream C2 (cooling fluid) is flowed from a suitable source (e.g., ambient air at 300° K. for example) through the elements 22 of the second series S2 in a direction opposite or counter to the previous flow of the heated cooling stream C1. The second cooling stream C2 is flowed through the second series S2 typically by a fluid pump 100' and conduit means 101', both schematically shown. The pump 100' may be the same or different pump as used for stream C1. The second cooling stream C2 starts at an initial temperature of 300° K. for example at the extreme right hand end of the second series S2 and is heated as it flows through the previously heated elements 22 in the second series S2.

The cooling steam C2 extracts heat from each element 22 in the second series S2 over a range of stream (fluid) temperatures. Each element 22 in the second series S2 is cooled by the stream C1 from its respective $A_f$ to its respective $M_f$ temperature to produce the extended shape (see right hand side of FIG. 3B) and thus the other half of the aforementioned work stroke of the elements 22.

The temperature of the cooling fluid C2 thus increases as it flows from right to left through the second series S2 of elements 22. The temperature of the cooling stream C2 will be highest as it exits from the extreme left hand element 22 of the second series S2. However, the highest temperature reached by the cooling stream C2 in the second series S will be below the original temperature of the heated cooling stream C1 (826° K.) for reasons stated above. For example, the highest temperature of the heated cooling stream C2 is shown as 753° K. as it emerges from the left-hand element 22 of the second series S2.

When the heated cooling stream C2 emerges from the last element 22 at the left-hand end of the second series, the heated stream C2 is directed by the conduit means 101' to flow through the next series S3. A similar arrangement to that described above continues from one series to the next until the heated stream CN-1 (the coolant stream for the next-to last series) is directed by a suitable conduit to flow through the last series SN, comprising the bottom row of elements 22 as shown in FIG. 2. The heated cooling stream CN-1 thus becomes the heating fluid for the series SN of elements 22 such that each element 22 in the series SN is heated by the stream CN-1 from its respective $M_f$ to its respective $A_f$ temperature to produce the contracted shape (see left hand side of FIG. 3B) and thus one-half of the aforementioned work stroke (i.e., half-cycle of operation of the apparatus 10). The heated cooling stream CN-1 is ultimately exhausted from the extreme right-hand element 22 of the series SN when its temperature is near-ambient (i.e., so close to ambient temperature as to be ineffective to operate additional elements 22).

A cooling stream "CN" (cooling fluid) is flowed alternately from a suitable source (e.g., ambient air at 300° K. for example) through the elements 22 of the series SN in a direction opposite or counter to the previous flow of the heated cooling stream CN-1. The cooling stream CN is flowed through the series SN typically by pump 100" and conduit means 101", both shown schematically. The pump 100" may be the same or different pump as used for streams C1,C2 . . . . The cooling stream CN starts at an initial temperature of 300° K. for example at the extreme right hand end of the series SN and is heated as it flows through the previously heated elements 22 in the series SN. The cooling steam CN extracts heat from each element 22 in the series SN over a range of stream (fluid) temperatures. Each element 22 in the series SN is cooled by the cooling stream CN from its respective $A_f$ to its respective $M_f$ temperature to produce the extended shape (see right hand side of FIG. 3B) and thus the other half of the aforementioned work stroke of the elements 22.

The temperature of the cooling fluid CN thus increases as it flow from right to left through the series SN of elements 22. The temperature of the cooling stream CN will be highest as it exits from the extreme left hand element 22 of the series SN. However, the highest temperature reached by the cooling stream CN in the series SN will be below the original temperature of the heated cooling stream CN-1 for reasons stated above.

The use of cooling streams C1,C2 . . . CN as cooling streams for the preceding series of elements 22 and then as heating streams for the next following series of elements 22 can be continued to extract further thermal energy indirectly from the original exhaust stream ES. Since the highest temperature reached by each heated cooling stream C1,C2 . . . CN decreases from one series S1,S2 . . . SN of elements 22 to the next, this temperature ultimately becomes so low that no additional series of elements 22 can be operated in the apparatus 10.

Although each shape memory element 22 in each series S1,S2 . . . SN operates with relatively low thermal efficiency, use of the second and following series S2 . . . SN of elements 22 as described hereabove to extract heat rejected from previous series (i.e., to extract heat indirectly from original exhaust stream ES) does not require additional heat input to the apparatus 10. In effect, although only the first series of elements 22 extracts heat directly from the exhaust stream ES, the following series S2 . . . SN of elements 22 extract rejected heat to do work without further heat input to the apparatus 10. The extraction of heat by the multiple series S1,S2 . . . SN of elements 22 in the manner described hereabove thus considerably increases the overall efficiency of the apparatus 10 in recovering usable thermal energy from the original exhaust stream ES. At the same time, the thermal energy recovered from the exhaust stream ES is converted to useful work by the work stroke of the shape memory elements 22 that results from the contracted/extended shape changes of the elements. The useful work is illustrated as effecting rotation of the crankshaft 12 that could be used to drive an air conditioning compressor or other accessory of the vehicle in which the engine EG is mounted.

While the shape memory elements 22 are shown in FIG. 1 as arranged in distinct series along the length of the crankshaft 12, the invention is not so limited. For example, the shape memory elements 22 could be arranged in an axially extending spiral along the length of the crankshaft 12 in a manner that the crankshaft 12 is rotated by the element shape changes described hereabove.

While the invention has been described in terms of specific embodiments thereof, it is not intended to be limited thereto but rather only to the extent set forth in the claims which follow.

We claim:

1. Energy recovery apparatus for recovering and using thermal energy, comprising:
   a) means for directing a heating fluid along a first series of shape memory elements having a decreasing transformation temperature range from one element to the next in the direction of flow of a heating fluid such that thermal energy is extracted from the heating fluid over a range of fluid temperatures to heat said elements sufficiently to effect a shape change of said elements,
   b) means for directing a first cooling fluid along said first series of heated shape memory elements in a direction opposite to the direction of flow of said heating fluid such that thermal energy is extracted from said elements over a range of temperatures to cool said elements sufficiently to effect another shape change of said elements,
   c) means for directing the heated first cooling fluid from said first series of shape memory elements along a second series of shape memory elements having a decreasing transformation temperature range from one element to the next in the direction of flow of said heated first cooling fluid such that thermal energy is extracted from the heated cooling fluid over a range of fluid temperatures to heat said elements sufficiently to effect a shape change of said elements,
   d) means for directing a second cooling fluid flow along said second series of heated shape change memory elements in a direction opposite to the direction of flow of said heated first cooling fluid such that thermal energy is extracted from said elements over a range of temperatures to cool said elements sufficiently to effect another shape change of said elements, and
   e) means operably coupled to said shape memory elements for converting said shape changes thereof to mechanical work.

2. The apparatus of claim 1 wherein said means for directing said heating fluid along said first series of shape memory change elements comprises means for conveying a waste heating fluid along said first series of said elements.

3. The apparatus of claim 2 wherein said waste heating fluid comprises exhaust gases from an internal combustion engine.

4. The apparatus of claim 1 wherein said first cooling fluid comprises ambient air flowed along said first series of shape memory elements.

5. The apparatus of claim 1 wherein said second cooling fluid comprises ambient air flowed along said second series of shape memory elements.

6. The apparatus of claim 1 wherein said first series of shape memory elements comprise tubular members through which said heating fluid and said first cooling fluid are alternately flowed.

7. The apparatus of claim 1 wherein said second series of shape memory elements comprise tubular members through which said first heated cooling fluid and second cooling fluid are flowed.

8. Energy recovery apparatus for recovering and using thermal energy, comprising:
   a) means for directing a waste heating fluid along a first series of shape memory elements having a decreasing transformation temperature range from one element to the next in the direction of flow of said heating fluid such that thermal energy is extracted from the heating fluid over a range of fluid temperatures to heat said elements sufficiently to effect a shape change of said elements,
   b) means for exhausting said heating fluid to ambient when said heating fluid reaches a near-ambient temperature,
   c) means for directing a first cooling fluid along said first series of heated shape memory elements in a direction opposite to the direction of flow of said heating fluid such that thermal energy is extracted from said elements over a range of temperatures to cool said elements sufficiently to effect another shape change of said elements,
   d) means for directing the heated first cooling fluid from said first series of shape memory elements along a second series of shape memory elements having a decreasing transformation temperature range from one element to the next in the direction of flow of said heated first cooling fluid such that thermal energy is extracted from the heated cooling fluid over a range of fluid temperatures to heat said elements sufficiently to effect a shape change of said elements,
   e) means for exhausting said heated first cooling fluid to ambient when it reaches a near-ambient temperature,
   f) means for directing a second cooling fluid along said second series of heated shape change memory elements in a direction opposite to the direction of flow of said heated first cooling fluid such that thermal energy is extracted from said elements over a range of temperatures to cool said elements sufficiently to effect another shape change of said elements, and
   g) means operably coupled to said shape memory elements for converting said shape changes thereof to mechanical work.

9. The apparatus of claim 8 wherein said waste heating fluid comprises exhaust gases from an internal combustion engine.

10. The apparatus of claim 8 wherein said first cooling fluid comprises ambient air flowed along said first series of shape memory elements.

11. The apparatus of claim 8 wherein said second cooling fluid comprises ambient air flowed along said second series of shape memory elements.

12. The apparatus of claim 8 wherein said first series of shape memory elements comprise tubular members through which said heating fluid and said first cooling fluid are alternately flowed.

13. The apparatus of claim 8 wherein said second series of shape memory elements comprise tubular members through which said first heated cooling fluid and said second cooling fluid are flowed.

14. A method of recovering and using thermal energy, comprising:
   a) directing a heating fluid along a first series of shape memory elements having a decreasing transformation temperature range from one element to the next in the direction of flow of said heating fluid such that thermal energy is extracted from the heating fluid over a range of fluid temperatures to heat said elements sufficiently to effect a shape change of said elements, b) directing a first cooling fluid along said first series of heated shape memory elements in a direction opposite to the direction of flow of said heating fluid such that thermal energy is extracted from said elements over a range of temperatures to cool said elements sufficiently to effect another shape change of said elements, c) directing the heated first cooling fluid from said first series of shape memory elements along a second series of shape memory elements having a decreasing transformation temperature range from one element to the next in the direction of flow of said heated first cooling fluid such that thermal energy is extracted from the heated cooling fluid over a range of fluid temperatures to heat said elements sufficiently to effect a shape change of said elements, d) directing a second cooling fluid flow along said second series of heated shape change memory elements in a direction opposite to the direction of flow of said heated first cooling fluid such that thermal energy is extracted from said elements over a range of temperatures to cool said elements sufficiently to effect another shape change of said elements, and e) converting said shape changes of said elements to mechanical work.

* * * * *